United States Patent [19]

Sillart

[11] Patent Number: 5,033,103
[45] Date of Patent: Jul. 16, 1991

[54] MODEL OF THE LATERAL INHIBITION, ENERGY NORMALIZATION, AND NOISE SUPPRESSION PROCESSES IN THE RETINA

[75] Inventor: Jeffrey E. Sillart, Belmont, Mass.

[73] Assignee: The United States of America as represented by the Secretary of the Air Force, Washington, D.C.

[21] Appl. No.: 283,114

[22] Filed: Dec. 9, 1988

[51] Int. Cl.$^5$ .............................................. G06K 9/40
[52] U.S. Cl. ........................................ 382/54; 382/1; 382/65; 382/68
[58] Field of Search .................... 382/54, 6, 58, 65, 66, 382/67, 68, 69, 41, 1

[56] References Cited

U.S. PATENT DOCUMENTS

| | | | |
|---|---|---|---|
| 3,016,518 | 1/1962 | Taylor | 340/149 |
| 3,088,096 | 4/1963 | Steinbuch | 340/146.3 |
| 3,187,304 | 6/1965 | Taylor | 340/146.3 |
| 3,701,095 | 10/1972 | Yamaguchi et al. | 340/146.3 MA |
| 3,964,021 | 6/1976 | Tamches | 340/146.3 MA |
| 4,318,083 | 3/1982 | Argyle | 340/146.3 F |
| 4,521,773 | 6/1985 | Lyon | 382/68 |
| 4,716,312 | 12/1987 | Mead et al. | 307/475 |

OTHER PUBLICATIONS

Stillart, J. E. "A Computer Model of Inhibition, Energy Normalization, and Noise Suppression" Dec. 17, 1987.

Werblin W. S., "The Control of Sensivity in the Retina", Jan., 1983 Scientific American, pp. 70-79.
Rosenblith, W. A. Chapter 11 of text "Sensory Communication" pp. 183-203, Jul. 19, 1959.
Werblin, F. S., "Synaptic Interactions Mediating Bipolar Response in the Retina of the Tiger Salamander" pp. 205-228.
Fukushima, K. "Visual Feature Extraction by a Multilayered Network of Analog Threshold Elements", published in IEEE Trans. Syst. Science and Cybernetics, vol. SSC-5, No. 4, Oct. 1969, pp. 322-333.
Fukushima, K., "An Electronic Model of the Retina", published in Proceedings of the IEEE, on Dec. 1987, pp. 1950-1951.
Mead et al., "Real-Time Visual Computations Using Analog CMOS Processing Arrays", dated Nov. 1987.

Primary Examiner—David K. Moore
Assistant Examiner—Joseph Marcuso
Attorney, Agent, or Firm—William G. Auton; Donald J. Singer

[57] ABSTRACT

A digital image processing system is disclosed that uses a camera, a monitor and a computer which models the inhibition, energy normalization, and noise suppression processes in a generic retina. The retinal computer program enhances edges, eliminates brightness variations in a scene for a given object and background, and suppresses noise to the extent that objects were extracted from noise. The model uses many parameters which can be extensively adjusted in an attempt to achieve the optimum image.

5 Claims, 2 Drawing Sheets

MODEL OF THE LATERAL INHIBITION, ENERGY NORMALIZATION, AND NOISE SUPPRESSION PROCESSES IN THE RETINA

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to image processing systems, and more specifically to a system which models the lateral inhibition, energy normalization, and noise suppression processes in a generic vertebrate retina. This retinal model enhances edges, eliminates brightness variations in a scene (image) for a given object and background, and suppresses noise to the extent that objects (signals) are extracted from noise in an image processing system.

Mankind has tried for centuries to understand data acquisition and perception processes in animal visual systems. Just as the optical elements of the earliest cameras were modeled on their counterparts in the human eye (lens, iris, and retina etc), modern image processing systems can still be improved on the subtler aspects of the vertibrate retina. Accordingly, an effort has been to construct machines to perform some visual function with specific regard to its realization by living systems. For example, pattern recognition has been investigated for many decades. One reasonably successful method to do pattern recognition is based on correlation. A correlator compares patterns using a well defined mathematical process to decide whether the patterns are similar.

Studying the correlator as a model of the human visual system may be important because the human brain may be correlating visual data as part of the pattern recognition process. If correlators actually exist in the brain, other elements must be present to eliminate some of the shortcomings that correlators exhibit. The correlator problems considered here are uncontrolled illumination, object reflectivity and noise.

The task of enhancing pattern recognition systems with an image processing system based on a model of the human retina is alleviated, to some extent, by the systems described in the following U.S. Patents, the disclosures of which are incorporated herein by reference:

| | |
|---|---|
| U.S. Pat. No. 3,964,021 | issued to Tamches; |
| U.S. Pat. No. 4,318,083 | issued to Argyle; |
| U.S. Pat. No. 4,716,312 | issued to Mead et al. |
| U.S. Pat. No. 3,016,518 | issued to Taylor; |
| U.S. Pat. No. 3,088,096 | issued to Steinbuch; |
| U.S. Pat. No. 3,187,304 | issued to Taylor; and |
| U.S. Pat. No. 3,701,095 | issued to Yamaguchi et al. |

Perhaps the most significant of the above-cited patents is the Tamches patent, which discloses an analog electronic system for preprocessing an optical pattern in a spatially modulated scene. The other patents disclose image and signal processing systems and optical pattern recognition systems.

The approach of making an electronic model of a vertibrate retina is more fully explored in the following four technical articles, the disclosures of which are specifically incorporated herein by reference:

an article by Frank S. Werblin entitled, "The Control of Sensitivity in the Retina," published in Scientific American, 228: p. 70-79 on January 1973; an article by K. Fukushima entitled "An Electronic Model of the Retina" published in Proc. of the I.E.E.E. on December 1987, p. 1950-1951; an article by Carver A. Mead et al. entitled "Real-Time Visual Computations Using Analog CMOS Processing Arrays" dated November 1987; and an article by K. Fukushima entitled "Visual Feature Extraction by a Multilayered Network of Analog threshold Elements" published in I.E.E.E. Trans. Syst. Sci. Cybernetics, Vol SSC-5 pp 322-333 on October 1969.

The present invention is greatly indebted to the above-cited Werblin reference which discloses retinal electrical characteristics including receptor cell response ranges and response amplitudes. While Werblin is excellent in its documentation of the electrical responses of retinal cells and retinal sensitivity, it does not apply this knowledge to image processing systems.

Both of the Fukushima articles discuss analog electronic models of a vertibrate retina and are exemplary in the art. While these analog systems are state of the art feature extraction and pattern recognition systems, a digital image processing system would have more adjustable flexibility than these systems, and would be an advance in the art.

Carver A. Mead et al describe a set of analog VLSI retina chips which are used in photoreception and processing. While it is encouraging to find such artificial vision systems being modeled on biological vision processes, the task remains to provide a digital image processing system which models the lateral inhibition, energy normalization, and noise suppression processes in a generic vertibrate retina. The present invention is intended to satisfy that need.

SUMMARY OF THE INVENTION

The present invention is a system which models the lateral inhibition, energy normalization, and noise suppression processes in a generic vertebrate retina. The vertebrate retinal model enhances edges, eliminates brightness variations in a scene (image) for a given object (in the form of a signal) and background, and suppresses noise to the extent that objects (in the form of signals) are extracted from noise. One particular embodiment of the present invention accomplishes these functions in an image processing system which uses: a video camera, a monitor, a computer, a Micro-Vax Intech board, and a Tektronics hardcopy unit. The video camera is electrically connected to the computer by the Micro-Vax Intech board, which acts as a computer interface and digitizes the signals from the camera. The computer performs the image processing functions discussed above using an original program to allow the monitor and hardcopy unit to display improved images.

It is a principal object of the present invention to provide a method to enhance edges, minimize brightness variations for a given object and background in a scene and suppress noise to ensure that patterns can be successfully identified by a correlator or other pattern recognition device.

It is another object of the invention to provide an image preprocessing system that digitally enhances detected images using some of the functions found in a vertibrate retina.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention includes an image processing system which models characteristics of a vertibrate retina in order to: enhance image edges, eliminate brightness variations in a scene (image) for a given object and background, and suppress noise in an image.

As mentioned above, a correlator compares patterns using a well defined mathematical process to decide whether the patterns are similar. The correlator problems experienced by systems prior to the present invention include uncontrolled illumination, object reflectivity and noise. Based mostly on the work of Werblin, the present invention models the inhibition, energy normalization, and noise suppression processes in the retina to eliminate these correlator problems.

Figure 1:
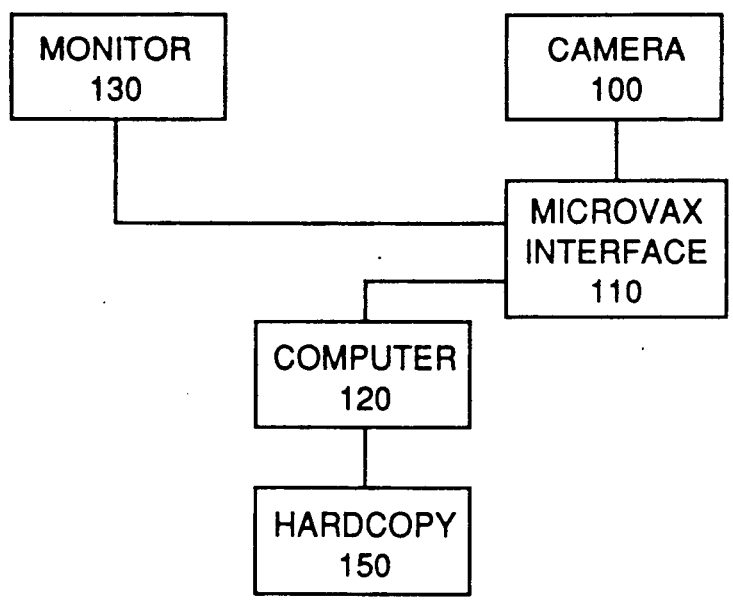
FIG. 1 is a block diagram of one embodiment of the present invention.

The reader's attention is now directed towards FIG. 1 which is a block diagram of an embodiment of the present invention. The system of FIG. 1 is an image processing system which uses: a video camera 100, a Micro-Vax interface board 110, a Micro-Vax II computer 120, a monitor 130 and a hardcopy printer unit 150 in order to process and display enhanced images using some of the image processing features of a biological retina as information from an article by Frank S. Werblin entitled "The Control of Sensitivity in the Retina" published in the Scientific American, Vol 228 p 70–79. The system of FIG. 1 is just one example of the application of the present invention, and uses equipment which is commercially-available. For example, this version of the system included a Micro-Vax Intech board, Dage 650 camera, Deanza video monitor, and a Tektronics hardcopy unit. The video camera 100 is electrically connected to the computer 120 by the Micro-Vax Intech board 110, which acts as a computer interface and digitizes the signals from the camera. The computer 120 performs the image processing functions discussed above using an original program to allow the monitor and hardcopy unit to display improved images.

Before proceeding to a description of the software programs, it is important for the reader to understand the characteristics of the retina. Information from the above-cited Werblin article as well as that of chapter 11 of the text edited by R. A. Rosenblith entitled "Sensory Communication" published on July 19, 1959, are included in the discussion that follows in order to acquaint the reader with these features. Virtually all of the information that follows was the subject of a master's degree thesis by the inventor which has been cataloged and retained by AFIT (the Air Force Institute of Technology) as AFIT/GE/ENG 87D-59, the disclosure of which is incorporated herein by reference. The retina enhances edges (done through the inhibition process), minimizes brightness variations in a scene (energy normalization) and suppresses noise to help ensure that patterns are successfully identified. A device emulating these retinal processes can be used as a preprocessor to a correlator or other pattern recognition device to improve recognition performance. A retinal-type processsessor can also be used to extract signals (for example communication signals) from noise. These are only two of the many possible applications for such a device.

As part of this invention software was developed to emulate the inhibition, energy normalization, and noise suppression processes. One computer program modeled the eye of an invertebrate, the horseshoe crab (*Limulus polyhemus*) and the other modeled the generic vertebrate retina. The processing of color was not included in either model. The horseshoe crab model considered the inhibition process in the horseshoe crab eye. The vertebrate model (presented below as Table 1) considered inhibition, energy normalization, and noise suppression. Additionally, both programs model eye behavior consequent to motion or a change in illumination.

A computer model of the horseshoe crab eye (presented below as Table 2) was first developed to better understand the general nature of inhibition processes in distributed image processors. A computer program was then developed to model the vertebrate retina so that later a silicon chip circuit or optical device could be developed and implemented as a preprocessor to a pattern recognition system.

A subroutine was first developed to allow the user to create sub-retinal regions or blocks (a block represents a cell in the vertebrate retina or an omatidium (12 cells that function as a processing unit) in the horseshoe crab eye) of different sizes so that different sized retinas could be tested while using camera images or stored images of 512×480 pixels. Computer code to do lateral inhibition as performed by the horseshoe crab was developed next. Code was also written to model inhibition, energy normalization and noise suppression in the vertebrate retina. Additionally an energy normalization subroutine, written to work independently of the inhibition process, is given in Table 3. Each of these subroutines was tested separately. Up to three cell layers can be used depending on the retina of interest. For the vertebrate retina three cell layers were modeled and in the horseshoe crab eye, one layer was used.

The human visual system can recognize objects over a wide range of illumination levels. The retina of the eye helps this function by a complex preprocessing operation. The pupil of the eye, unlike the aperture of a camera, plays a small role in this process. The retina sends data over one million nerve fibers to the brain, and each nerve fiber handles a different part of the visual field. The retina compresses the range of intensities it receives before sending the information over these nerve fibers.

Figure 2:
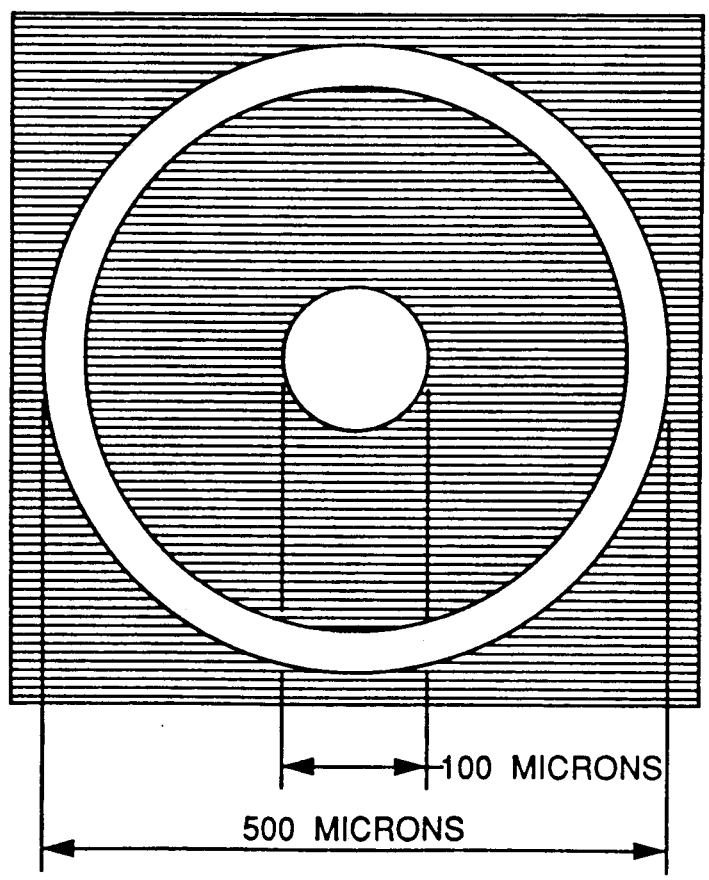
FIG. 2 is an illustration of the electrically responsive area of retinal cells.

Werblin studied the retina of the mudpuppy (salamander, *Necturus maculosas*) because it was easy to probe and because it represents a generic vertebrate retina. Werblin flashed a spot of light, as shown in FIG. 2, on the retina of a mudpuppy to provide an input stimuli to enable measurements of the behavior of each type of retinal cell. Werblin then stimulated the retina with a spot of light with a ring of light around it as shown in FIG. 2. He repeated his steps for each cell type. Werblin discovered that each neuron type responded differently. When Werblin illuminated a receptor cell, the voltage across the membrane of the bipolar cell connected to the receptor cell became more negative with respect to a reference electrode attached to the animal (hyperpolarized). However, when neighboring receptor cells were illuminated the bipolar cell membrane became more positive (depolarized). Werblin concluded that the horizontal cells inverted the bipolar cell response when they were activated by the ring stimulus. When the receptor cells were illuminated by the spot stimulus, they responded strongly, but when neighboring receptors were illuminated with the spot/ring pattern they responded poorly. Werblin concluded that the horizontal cells influenced the behavior of the receptor cells. To further support his theory of the receptor/horizontal cell connection and bipolar/horizontal cell connection, Werblin showed that the horizontal cells responded strongly to both the spot and spot/ring stimuli. He also showed that when the spot stimulus was shown, the sustained ganglion cell responded strongly. When the spot/ring stimulus was used, the response of the cell was minimal.

Floyd Ratliff discovered that a test eccentric cell was inhibited (discharged fewer pulses and at a lower rate) when neighboring omatidia were illuminated. Ratliff determined that the amount of inhibition was a function of the following three parameters:

1. The number of neighboring omatidia illuminated.
2. The intensity of illumination on the neighboring omatidium.
3. The distance of illuminated omatidia from the test cell.

Ratliff found that the closer an inhibitory omatidium was the more of an inhibitory effect it had on the test cell.

Ratliff in his experiments on the Limulus eye derived an equation that closely predicts the effects of inhibition on an omatidium by its neighbors. Sillart implementation of Ratliff's equation is shown below:

$$\text{Inhibited response} = E - K(R - \text{threshold of neighbor}) \quad (1)$$

where:
$E$ = the response of the cell being processed;
$K$ = Inhibitory coefficient; and
$R$ = Response of the inhibiting cell.

Ratliff determined that the inhibitory coefficient decreases in value the farther away an inhibiting cell is. Ratliff also determined that the threshold of an inhibitory cell increases in value the farther it is from the cell to be inhibited. In general, Ratliff found:

$$\text{Inhibited Response} = E - \text{Sum of effects from each inhibiting cell where } E \text{ in Eg. 2 is the response of the cell being processed.} \quad (2)$$

Ratliff was unable to determine an equation for the coefficient of inhibitory action and the threshold frequency. In determining the above equation Ratliff assumed that neighboring cells were separated far enough apart to ignore the inhibitory effects on each other yet close enough to the test cell to influence it significantly.

Early on the INHIBIT subroutine used the inhibition equation shown in Table 3. The variance used in Table 3 is in error; therefore, a variance dependent on the maximum inhibition region selected by the user was developed. Also to speed the inhibition calculation up, a look up table (in Table 2) was developed to hold the Gaussian weighting used to weight the intensities of the inhibiting omatidia. An error exists in the horseshoe crab program; therefore, no results were generated. The error is believed to exist in either calculating the Gaussian weightings or in the INHIBIT subroutine itself because all the other subroutines were extensively tested and are used by the vertebrate retinal software.

Tables 1-3, as presented here, are three programs which may be run by the computer 120 of FIG. 1 as models of retinal processes. Table 1 lists a software model for a vertibrate retina; Table 2 is a software model for the retina of a horseshoe crab (Limulus); and Table 3 is the listing of an energy normalization software program. The rationale behind these programs is presented below, beginning with a discussion of the model of inhibition in the horseshoe and inhibition and excitation by the retina, and a comparison of it with the features of Table 1.

Appendix A: Vertebrate Retinal Software

```
#include <itex100.h>
#include <stdtyp.h>
include <math> struct array(
            int data[512];
    };
    static struct array pic[512];
    static int x,y,i,j,k,l,p,q;
    int input,bksize,yextent,xextent;
    int st,xfin,yfin,jfin,ifin,xrang,yrang;
    int sigtobrain,image,nframes,num,cam;
    int change,width,height,avreg,avrang;
    int loop;
    double multfactor;
    resp[512][480];
    static int pbipolarresp[512][480],bipolarresp[512][480];
/***************************************************************/
```

```c
main()
{
 unsigned base = 0x1600;
 long mem = 0x200000L;
 int flag = 1, block = 8;
 sethdw(base,mem,flag,block);
 initialize();

change = 0;

for (; ;){ printf("Deleting reserved file names\n");

/* Deletes images acquired during */
    /* the last time through this program */ system ("delete picture.img;*");
    printf("Enter a 1 if you want to use camera images\n");
    printf("else enter a 0 to use ready-made images\n");
    scanf("%d",&image);
    getchar();

if (image == 1 ) {
       printf("Enter camera to use, 0,1 or 2\n");
       scanf("%d",&cam);
       getchar();
       setcamera(cam);
       printf("Enter a 1 if you want the camera\n");
       printf("to grab a selected number\n");
       printf("of succesive images\n");
       printf("Enter a 0 if you want to reposition\n");
       printf("the camera after each frame for \n");
       printf("a selected number of successive images\n");
       scanf("%d",&input);
       getchar();
       printf("Enter the number of frames you want\n");
       scanf("%d",&nframes);
       getchar();
    }
    else nframes = 1;

printf("To avoid cutoff blocks enter a 1,2,4,8,16,or 32\n");
    printf("for the blocksize (bksize) . . . . . . . . . . . . . . . \n");
    scanf("%d",&bksize);
    getchar();
    if (bksize < 1) bksize = 1;
    printf("Enter an integer between 0 and 255 for the maximum number\n");
    printf("of receptors you want to the left and right of a receptor\n");
    printf("block in its excitation region\n");
    scanf("%d",&xextent);
    getchar();
    printf("Enter an integer between 0 and 239 for the number of\n");
    printf("receptor blocks you want above and below a receptor\n");
    printf("block in its excitation region\n");
    scanf("%d",&yextent);
    getchar();
    printf("How many times wider than the excitation region\n");
    printf("do you want the inhibition region \n");
    scanf("%d",&width);
    getchar();
    printf("How many times higher than the excitation region\n");
    printf("do you want the inhibition region \n");
```

```
scanf("%d",&height);
getchar();
printf("Enter the region over which the average intensity\n");
printf("will be calculated for a cell and assigned to a cell\n");
scanf("%d",&avreg);
getchar();
xrang = xextent * bksize;
yrang = yextent * bksize;
avrang = avreg * bksize;
st = (int)(bksize/2);
xfin = 512;
yfin = 480;
multfactor = 1.4;

if (image == 1)  savecameraimages();    /* Acquires camera images */
                                        /* and saves them on disk */ else displaystoredimage();              /* The user can select one */
                                        /* of 3 prestored images and */
                                        /* display it on the monitor */ for (y = 0; y < 480; y++) {
  for (x = 0; x < 512; x++) {
    pbipolarresp[x][y] = 0;             /* Previous bipolar response */
} }                                     /* Sleeping state */ for (num = 1; num < nframes+1; num++) {
    if (image == 1) {
                                        /* Retrieves from disk memory a */
                                        /* camera image and displays it */
                                        /* on the monitor screen */ readim(0,0,512,480,"picture.img;num","no");
      for (y = 0; y <480; y++) {
        rhline(0,y,512,pic[y].data);    /* Image is saved in an array */
      }
    } if (bksize != 1) { /* Uses original scene */
    create();          /* This function creates bksize x bksize blocks */
    }                  /* of pixels(Each block represents 1 cell) */
                       /* and assigns to each pixel in the block the */
                       /* average intensity value of the block */ if (bksize ==1) {
      average();       /* Calculates the average for a region around */
                       /* a cell block that will be inhibited and */
                       /* assigns this intensity to the cell block */

}
    inhibit();         /* Output from a cell block */ for (y = 0; y < 480; y++){
      for (x = 0; x < 512; x++){
        bipolarresp[x][y] = resp[x][y]; /* Saves the present bipolar */
} }                                     /* cell block response */ for (y = 0; y < 480; y++){
      for (x = 0; x < 512; x++){

/* Compares the present bipolar response to the previous */
/* bipolar response. If there was a change then it */
/* tells the user. Then, it reduces the intensity value */
```

```c
    /* output from the transient ganglion cell block layer */
    /* by dividing the response of each ganglion cell block by */
    /* the average intensity value of the inhibition region */ if (pbipolarresp[x][y] == bipolarresp[x][y]) {
          sigtobrain = 0;
        }
        else {
          sigtobrain = 1;
          x = y = 512;
        }
    } } if (sigtobrain == 0 ) {
      printf("\n No change in illumination was detected\n");
        /* inhibit(); */
    }
      else {
        printf("\n A change in illumination was detected\n");
        /* inhibit(); */
      }

/* for (y = 0; y < 480; y++) {          */
    /*   for (x = 0; x < 512; x++) {        */
    /*     resp[x][y] = bipolarresp[x][y];  */
    /* } }                                  */

/* change = change + 1;                 */
    /* inhibit();                           */ for (y = 0; y < 480; y++){
      for (x = 0; x < 512; x++){
        pbipolarresp[x][y] = bipolarresp[x][y];
    } }
    } printf("Enter a 1 if you want to rerun the program\n");
    printf("otherwise enter a 0\n");
    scanf("%d",&input);
    getchar();
    if (input == 0) {
      break;
    }
  }
}
/***********************************************************************/
displaystoredimage()

for(; ;){
  printf("Enter a 0 if you want to display a rectangle\n");
  printf("Enter a 1 if you want to display a noisy scene\n");
  printf("Enter a 2 if you want to display vertical bars\n");
  printf("Enter a 3 if you want pic.pic (half lopass/half orig) \n");
  printf("with three low intensity rectangles\n");
  scanf("%d",&input);
  getchar();

if (input != 0 && input != 1 && input != 2 && input != 3){
    printf("Bad input\n");
  }
  else {
    break;
  }
}
```

```
}
if (input == 0){
   sclear(55,1);                          /* Clears the screen */
   aclear(248,32,144,144,25);             /*Displays a rectangle on the screen */
   printf("Okay . Reading image into array\n");
   for (y = 0; y <480; y++) {
       rhline(0,y,512,pic[y].data);
   }
} if (input == 1){
   readim(0,0,512,480,"block.pic","no");    /*Reads in the noisy scene */
   printf("Okay . Reading image into array\n");
   for (y = 0; y <480; y++) {
      rhline(0,y,512,pic[y].data);
   }
} if (input == 2){                          /* Displays vertical bars of increasing */
                                          /* intensity across the monitor. */
   aclear(0,0,64,480,64);
   aclear(64,0,64,480,80);
   aclear(128,0,64,480,96);
   aclear(192,0,64,480,112);
   aclear(256,0,64,480,128);
   aclear(320,0,64,480,144);
   aclear(384,0,64,480,160);
   aclear(448,0,64,480,176);

/* aclear(0,0,64,480,176);
   aclear(64,0,64,480,160);
   aclear(128,0,64,480,144);
   aclear(192,0,64,480,128);
   aclear(256,0,64,480,112);
   aclear(320,0,64,480,96);
   aclear(384,0,64,480,80);
   aclear(448,0,64,480,64);*/ printf("Okay . Reading image into array\n");
   for (y = 0; y <480; y++) {
      rhline(0,y,512,pic[y].data);
   }
} if (input == 3){
   readim(0,0,512,480,"best10.img","no");    /*Reads in a noisy scene */
   printf("Okay . Reading image into array\n");
   for (y = 0; y <480; y++) {
      rhline(0,y,512,pic[y].data);
   }
} return;

/*************************************************************/
savecameraimages()           /* Displays successive images on the screen */
{
if (input == 1) {
```

```c
    for (num = 1; num < nframes+1; num++) {
      snap(1);                                          /* Takes (n) consecutive */
      saveim(0,0,512,480,0,"picture.img","no");         /* pictures and saves them */
    }
  }
  else if (input == 0) {
    for (num = 1; num < nframes+1; num++) {
      snap(1);                                          /* Takes a picture */
      saveim(0,0,512,480,0,"picture.img","no");         /* and saves it */
      if (num < nframes) {
          printf("Reposition the camera if you so desire\n");
          printf("After the camera has been properly\n");
          printf("positioned hit the CR key\n");
          getchar();
      }
    }
  } return;

}
/****************************************************************************/
average()

{
int xlc,xrc,yuc,ydc;
int sumint,nr;

printf("processing. please wait...\n");

for (y = st; y < yfin; y+=bksize) {
  for (x = st; x < xfin; x+=bksize) { if (x < avrang+st) xlc = st;
    else xlc = x-avrang;
                                           /* Calculates the left-most x */
                                           /* coordinate of the excitation */
                                           /* region */ if (x > 512-avrang-st) xrc = 512-st;
    else xrc = x+avrang;
                                           /*Calculates the right-most x */
                                           /* coordinate of the excitation */
                                           /* region */ if (y < avrang+st) ydc = st;
    else ydc = y-avrang;
                                           /* Calculates the lowest value */
                                           /* of y for the excitation region */
                                           /* (Above yuc on the screen) */ if (y > 480-avrang-st) yuc = 480-st;
    else  yuc = y+avrang;
                                           /* Calculates the highest value */
                                           /* of y for the excitation region */
                                           /* (Below ydc on the screen) */
    nr = 0;
    sumint = 0;

jfin = yuc+bksize;
    ifin = xrc+bksize;

for (j = ydc; j < jfin; j+=bksize) {   /* Calculates the average */
```

```c
      for (i = xlc; i < ifin; i+=bksize) {    /* value for a region */
        if (i==x && j==y) {                   /* input by the user  */
        }
        else {
          nr = nr+1;
          sumint = pic[j].data[i]+sumint;
        }
    } } resp[x][y] = (int)(sumint/nr);
} }

/* Displays the original scene after being averaged */ for (y =0; y < 480; y++) {
  for (x=0; x < 512; x++) {
    pic[y+st].data[x+st] = resp[x+st][y+st];
    aclear(x,y,bksize,bksize,pic[y+st].data[x+st]);
} }
printf("ok finished averaging\n");

return;

}
/*****************************************************************/
create()                           /* This function creates bksize x bksize blocks */
                                   /* of pixels(Each block represents 1 retinal) */
                                   /* cell and assigns each pixel in a block the */
                                   /* average intensity value of the block */

{
int  count,sum,avgint,xstart,ystart;
count=sum=0;

printf("Creating blocks representing receptor cells . . .\n for(l = 0; l < 480; l+=bksize) {

/* This loop reads 30 vertical blocks */
                             /* of bksize x bksize pixels(receptor cell) */ for (k = 0; k < 512; k+=bksize){

/* This loop reads 32 horizontal blocks */
                             /* of bksize x bksize pixels(receptor cell) */

/* Calculates the blocksize(1 block represents 1 receptor cell) */
  for (j = 0; j < bksize; j++) {
                             /* This loop reads bksize lines */
                             /* of bksize pixels */ for (i = 0; i < bksize; i++){
                             /* This loop reads 1 line of bksize pixels */ count = count + 1;

if (count == 1) {      /* If count = 1, save the upper left-hand */
        xstart = i+k;        /* x and y coordinates of the block */
        ystart = j+l;
      }
      sum += pic[j+l].data[i+k];   /* Sums up the intensities in the */
                                   /* bksize x bksize block */
```

```
    } }
    count = 0;

avgint = (int) (sum/(bksize*bksize));
                                            /* Calculates the average intensity */
                                            /* for the bksize x bksize block */
                                            /* of pixels */ sum = 0;

for (j = ystart; j < ystart+bksize; j++) {
                                            /* Fills the bksize x bksize block */
                                            /* of pixels with the average*/
                                            /* intensity value of the block */ for (i = xstart; i < xstart+bksize; i++){ pic[j].data[i] = avgint;            /* Stores the average value for each */
                                            /* bksize x bksize block */
                                            /* (receptor cell) */
      }
    }
  }
}
for(y = 0; y < 480; y++){                   /* Displays on the monitor */
  vhline(0,y,512,pic[y].data);              /* receptor blocks */
                                            /* Each block represents */
                                            /* 1 receptor cell */
return;

}
/*****************************************************************************/
inhibit()                   /* This subroutine calculates the response */
                            /* of each bipolar cell block */
                            /* to illumination in the scene. */
int xlc,xrc,yuc,ydc;
int exlc,exrc,exyuc,exydc;
int loop1,loop2,loop3,loop4;
int suminhibreg,sumextreg;
int nrextreg,nrinhibreg;
double k9,averageint,ratio;

printf("processing. please wait...\n");

for (y = st; y < yfin; y+=bksize) {
  for (x = st; x < xfin; x+=bksize) { if (x < xrang+st) xlc = st;
    else xlc = x-xrang;
                                            /* Calculates the left-most x */
                                            /* coordinate of the excitation */
                                            /* region */ if (x > 512-xrang-st) xrc = 512-st;
    else xrc = x+xrang;
                                            /*Calculates the right-most x */
                                            /* coordinate of the excitation */
                                            /* region */ if (y   yrang+st) ydc = st;
    else    = y-yrang;
                                            /* Calculates the low value */
                                            /* of y for the excitation region */
```

```
        if (y    ′0-v    -st)        )-st;                  /* (Above yuc on the screen) */
        else
                                              /* Calculates the highest value */
                                              /* of y for the    itation region */
                                              /* (Below ydc  n      screen) */ if ((x                              /* The inhibition region ex  */
          if (         ang) <  t)           /* to the left of xlc  */
            e  l   =
            l  p  =
          }
          else {
               - xlc-   - h*x
               pl = ex
          }
        }
        else                                     .nhibition region exists */
                                                 the left of xlc */ if (x          (                    .he inhibition region exists */
          if  r      *xrang) > 512-st) {    /* to the right of xrc */
            exrc = 512-st;
            loop2 = exrc;
          } else {
            exrc = xrc+(width*xrang);
            loop2 = exrc;
          }
        }
        else {
          loop2 = xrc;                          /* The inhibition region does */
        }                                       /* not exist to the right of xrc */ if (ydc != st) {                        /* The inhibition region exists */
          if (ydc-(height*yrang) < st) {        /* below ydc */
            exydc = st;
            loop3 = exydc;
          } else {
            exydc = ydc-(height*yrang);
            loop3 = exydc;
          }
        }
        else {
          loop3 = ydc;                          /* The inhibiton region does */
        }                                       /* not exist below ydc */ if (yuc != 480-st) {                    /* The inhibition region exists */
          if (yuc+(height*yrang) > 480-st) {    /* above yuc */
            exyuc = 480-st;
            loop4 = exyuc;
          } else {
            exyuc = yuc+(height*yrang);
            loop4 = exyuc;
          }
        }
```

```
    else {
      loop4 = yuc;                          /* The inhibition region does not */
    }                                       /* exist above yuc */ nrextreg = 0;
    nrinhibreg = 0;
    suminhibreg = 0;
    sumextreg = 0;

ifin = loop2+bksize;
    jfin = loop4+bksize;

for (j = loop3; j < jfin; j+=bksize) {
      for (i = loop1; i < ifin; i+=bksize) {
        if (i==x && j==y) {
        }
        else {
          if((i >= xlc) && (i <= xrc)&&
             (j >= ydc) && (j <= yuc)) {

/* Checks to see if */
                                            /* a cell is excitatory */ nrextreg = nrextreg + 1;        /* Calculates the number of */
                                            /* of excitatory cells. */ sumextreg = pic[j].data[i]+sumextreg;

/* Sums up the intensities */
          }                                 /* in the excitory region */
          else { nrinhibreg = nrinhibreg + 1;    /* Calculates the number of */
                                            /* cells in the excitory region */ suminhibreg = pic[j].data[i]+suminhibreg;

/* Sums up the intensities */
                                            /* in the inhibitory region */
          }
        }
      } } averageint = ((double)(sumextreg))/((double)(nrextreg));

/* Calculates the average intensity */
    k9 = ((double)(suminhibreg))/((double)(nrinhibreg));

/* Calculates the average intensity */
                                            /* value for the inhibitory region */

/* Calculates the output of a cell block */ averageint += 1.0;
    ratio = pow(averageint,multfactor)/(pow(averageint,multfactor) +
            pow(k9,multfactor));

if (change == 1) {
    /* resp[x][y] = (int) (128.0*ratio); */
    }
```

```
    else {
      resp[x][y] = (int) (255.0*ratio);
      if(resp[x][y] > 255) resp[x][y] = 255;
      if(resp[x][y] < 0) resp[x][y] = 0;
    }
}}

/* Displays the transient response of each cell block */ printf("Press CR to display inhibited image/n");
getchar();
for (p = 0; p < 480; p+=bksize) {
  for (q = 0; q < 512; q+=bksize) {
     aclear(q,p,bksize,bksize,resp[q+st][p+st]);
} } printf("\n ok finished inhibit");

return;

}
/*******************************************************************
```

*TABLE 2*

Appendix B: <u>Horseshoe crab Results and Software</u>

```
#include <itex100.h>
#include <stdtyp.h>
include <math> struct array{
          int data[512];
   };
   static struct array pic[512];
   static int  x,y,i,j,k,l,p,q;
   int input,bksize,yextent,xextent;
   int st,xfin,yfin,jfin,ifin,xrang,yrang;
   int disty,distx,nr,image,nframes,num,cam;
   int change,width,height;
   double multfactor,cst,argx,argy,vary,variable;
   static int resp[512][480],prevout[512][480];
   static double gaussx[16],gaussy[5];
/********************************************************************/ main()

unsigned base = 0x1600;
  long mem = 0x200000L;
  int flag = 1, block = 8;
  sethdw(base,mem,flag,block);
  initialize();

change = 0;

for (; ;){ printf("Deleting reserved file names\n");

/* Deletes images acquired during */
     /* the last time through this program */
```

```c
system ("delete picture.img;*");
printf("Enter a 1 if you want to use camera images\n");
printf("else enter a 0 to use ready-made images\n");
scanf("%d",&image);
getchar();

if (image == 1 ) {
   printf("Enter camera to use, 0,1 or 2\n");
   scanf("%d",&cam);
   getchar();
   setcamera(cam);
   printf("Enter a 1 if you want the camera\n");
   printf("to grab a selected number\n");
   printf("of succesive images\n");
   printf("Enter a 0 if you want to reposition\n");
   printf("the camera after each frame for \n");
   printf("a selected number of successive images\n");
   scanf("%d",&input);
   getchar();
   printf("Enter the number of frames you want\n");
   scanf("%d",&nframes);
   getchar();
}
else nframes = 1;

printf("To avoid cutoff blocks enter a 1,2,4,8,16,or 32\n");
printf("for the blocksize (bksize) . . . . . . . . . . . . . . . \n");
scanf("%d",&bksize);
getchar();
if (bksize < 1) bksize = 1;
printf("Enter an integer between 0 and 255 for the maximum number\n");
printf("of omatidia you want to the left and right of an omatidium\n");
printf("block in its inhibition region\n");
scanf("%d",&xextent);
getchar();
printf("Enter an integer between 0 and 239 for the number of\n");
printf("omatidia blocks you want above and below an omatidium\n");
printf("block in its inhibition region\n");
scanf("%d",&yextent);
getchar();
xrang = xextent * bksize;
yrang = yextent * bksize;

st = (int)(bksize/2);
xfin = 512;
yfin = 480;

/* Calculates a table of gaussian values for all possible */
/* distances (disty,distx) between an omatidium being inhibited */
/* and the inhibiting omatidium  as a function of the number */
/* of omatidia in the inhibition region selected above */ printf("\n calculating gaussian arrays.\n");

cst = -0.0314/((double) (bksize*bksize));
variable = 6.28*((double)yextent);

vary = ((double)(yextent*yextent))/(variable);

/* Calculates the variance */
                                                 /* in the y direction */
for (disty = 1; disty < 5; disty++) {
  argy = cst*((double)(disty*disty)/(vary));
  gaussy[disty] = exp(argy);
}
```

```c
for (distx = 1; distx < 16; distx++) {
  argx = cst*((double)(distx*distx)/(5.0*vary));
  gaussx[distx] = exp(argx);
} for (y = 0; y < 480; y++) {           /* Initializes the array that */
    for (x = 0; x < 512; x++) {        /* holds the inhibited output */
      resp[x][y] = 0;
    }
  } if (image == 1) savecameraimages();  /* Acquires camera images */
                                        /* and savess them on disk */

/* The user can select one */
  else displaystoredimage();            /* of 3 prestored images and */
                                        /* display it on the monitor */ for (num = 1; num < nframes+1; num++) {
    if (image == 1) {                   /* Retrieves from disk memory a */
                                        /* camera image and displays it */
                                        /* on the monitor screen */ readim(0,0,512,480,"picture.img;num","no");
      for (y = 0; y <480; y++) {
        rhline(0,y,512,pic[y].data);    /* Image is saved in an array */
      }
    } if (bksize != 1) {    /* Uses original scene */
                          /* This function creates bksize x bksize blocks */
      create();           /* of pixels(Each block represents 1 omatidia) */
    }                     /* and assigns to each pixel in the block the */
                          /* average intensity value of the block */

/* output from a cell block */
    in

} prin    'Enter a   if you want to rerun the program\n");
  scan ("%d",&inp  );
  getchar();
  if (input !=1) {
    break;
  }
}
/*****************************************************************/
displaystc for(; ;){
  printf("      _f you want to display a rectangle\n");
  printf("       if you want to display a noisy scene\n");
  printf("Ent      if you want to display vertical bars\n");
  printf("Enter a 3 if you want pic.pic (half lopass/half orig) \n");
  printf("with three low intensity rectangles\n");
  scanf("%d",&input);
```

```c
getchar();
if (input != 0 && input != 1 && input != 2 && input != 3){
  printf("Bad input\n");
}
else {
  break;
} if (input == 0){
  sclear(55,1);                       /* Clears the screen */
  aclear(248,32,144,144,25);          /*Displays a rectangle on the screen */
  printf("Okay .  Reading image into array\n");
  for (y = 0; y <480; y++) {
    rhline(0,y,512,pic[y].data);
  }
} if (input == 1){
  readim(0,0,512,480,"block.pic","no");    /*Reads in the noisy scene */
  printf("Okay .  Reading image into array\n");
  for (y = 0; y <480; y++) {
    rhline(0,y,512,pic[y].data);
  }
} if (input == 2){                /* Displays vertical bars of increasing */
                                /* intensity across the monitor. */
  aclear(0,0,64,480,64);
  aclear(64,0,64,480,80);
  aclear(128,0,64,480,96);
  aclear(192,0,64,480,112);
  aclear(256,0,64,480,128);
  aclear(320,0,64,480,144);
  aclear(384,0,64,480,160);
  aclear(448,0,64,480,176);

/* aclear(0,0,64,480,176);
  aclear(64,0,64,480,160);
  aclear(128,0,64,480,144);
  aclear(192,0,64,480,128);
  aclear(256,0,64,480,112);
  aclear(320,0,64,480,96);
  aclear(384,0,64,480,80);
  aclear(448,0,64,480,64);*/ printf("Okay .  Reading image into array\n");
  for (y = 0; y <480; y++) {
    rhline(0,y,512,pic[y].data);
  }
} if (input == 3){
  readim(0,0,512,480,"pic.pic","no");    /*Reads in a noisy scene */
  printf("Okay .  Reading image into array\n");
    for (y = 0; y <480; y++) {
      rhline(0,y,512,pic[y].data);
    }
  } return;

}
/***********************************************************************
```

```c
savecameraimages()                    /* Displays successive images on the screen */
{ if (input == 1) {
  for (num = 1; num < nframes+1; num++) {        /* Takes (n) consecutive */
    snap(1);                                      /* pictures and saves them */
    saveim(0,0,512,480,0,"picture.img","no");
  }
}
else if (input == 0) {
  for (num = 1; num < nframes+1; num++) {        /* Takes a picture */
    snap(1);                                      /* and saves it */
    saveim(0,0,512,480,0,"picture.img","no");
    if (num < nframes) {
       printf("Reposition the camera if you so desire\n");
       printf("After the camera has been properly\n");
       printf("positioned hit the CR key\n");
       getchar();
    }
  }
} return;

}
/***************************************************************************
                                    /* This function creates bksize x bksize blocks */
create()                             /* of pixels(Each block represents 1 receptor) */
                                     /* and assigns each pixel in a block the */
                                     /* average intensity value of the block */

{
int  count,sum,avgint,xstart,ystart;
count=sum=0;

printf("Creating blocks representing receptor cells . . .\n");

for(l = 0; l < 480; l+=bksize) {
                                    /* This loop reads 30 vertical blocks */
                                    /* of bksize x bksize pixels(receptor cell) */ for (k = 0; k < 512; k+=bksize){
                                    /* This loop reads 32 horizontal blocks */
                                    /* of bksize x bksize pixels(receptor cell) */

/* Calculates the blocksize(1 block represents 1 receptor cell) */ for (j = 0; j < bksize; j++) {    /* This loop reads bksize lines */
                                        /* of bksize pixels */ for (i = 0; i < bksize; i++){
                                        /* This loop reads 1 line of bksize pixels */ count = count + 1;

if (count == 1) {            /* If count = 1, save the upper left-hand */
              xstart = i+k;             /* x and y coordinates of the block */
              ystart = j+l;
           }
```

```c
            sum += pic[j+1].data[i+k];      /* Sums up the intensities in the */
                                            /* bksize x bksize block */
    } } count = 0;

avgint = (int)(sum)/(bksize*bksize);

/* Calculates the average intensity */
                                            /* for the bksize x bksize block */
                                            /* of pixels */ sum = 0;

for (j = ystart; j < ystart+bksize; j++) {

/* Fills the bksize x bksize block */
                                            /* of pixels with the average*/
                                            /* intensity value of the block */ for (i = xstart; i < xstart+bksize; i++){ pic[j].data[i] = avgint;           /* Stores the average value for each */
                                            /* bksize x bksize block */
                                            /* (receptor cell) */
    } }
} }
  for(y = 0; y < 480; y++){                 /* Displays on the monitor */
     whline(0,y,512,pic[y].data);           /* receptor blocks */
  }                                         /* Each block represents */
                                            /* 1 receptor cell */
return;

}
/********************************************************************/
inhibit()           /* Simulates the inhibitory affect neighboring omatidia */
                    /* have on each other, and displays the transient */
                    /* response of each eccentric cell block on the monitor */ int xlc,xrc,yuc,ydc;
int multfactor;
double sumrsp,const1,scalefactor;
sumrsp= 0.0;

printf("processing. please wait...\n");

for (y = st; y < yfin; y+=bksize) {
 for (x = st; x < xfin; x+=bksize) { if (x < xrang+st) xlc = st;
   else xlc = x-xrang;
                                            /* Calculates the left-most x */
                                            /* coordinate of the inhibition */
                                            /* region */ if (x > 512-xrang-st) xrc = 512-st;
   else xrc = x+xrang;
                                            /*Calculates the right-most x */
                                            /* coordinate of the inhibition */
                                            /* region */
```

```
      if (y < yrang+st) ydc = st;
      else ydc = y-yrang;
                                          /* Calculates the lowest value */
                                          /* of y for the inhibition region */
                                          /* (Above yuc on the screen) */ if (y > 480-yrang-st) yuc = 480-st;
      else  yuc = y+yrang;
                                          /* Calculates the highest value */
                                          /* of y for the inhibition region */
                                          /* (Below ydc on the screen) */ sumrsp = 0.0;                       /* Reinitializes the sum */
                                          /* of inhibitory responses */
                                          /* to zero */ ifin = xrc+bksize;
      jfin = yuc+bksize;

nr = (int)(((ifin-xlc)*(jfin-ydc))/(bksize*bksize));
                                          /* Calculates the number of */
                                          /* omatidia in an omatidia's */
                                          /* inhibition region */
      multfactor = 1.0;
      scalefactor = ((double)multfactor)/((double)nr);     /* Scale factor */
      for (j = ydc; j < jfin; j+=bksize) {
        for (i = xlc; i < ifin; i+=bksize) {
           distx = abs((i-x)/bksize);
           disty = abs((j-y)/bksize);
           if (i==x && j==y){  /* Excludes the response of the omatidia */
                               /* block you are looking at from the */
           }                   /* inhibited response */
           else {
              sumrsp += (gaussx[distx])*(gaussy[disty])*
                       ((double) pic[j].data[i]);
              prinf("%f\n",sumrsp);
           }
      } } resp[x][y] = pic[y].data[x]-(int)(scalefactor*sumrsp);
      if (resp[x][y] < 0) resp[x][y] = 0;

} }

/* Displays the transcient response of a scene */ for (p=0; p<480; p+=bksize) {
  for (q=0; q<512; q+=bksize) {
     aclear(q,p,bksize,bksize,resp[q+st][p+st]);
} } printf("\n ok finished inhibit");

return;

}
```

TABLE 3

Appendix C: <u>Energy Normalization Software</u>

```c
#include <itex100.h>
#include <stdtyp.h>
include <math> struct array{
        int data[512];
};
static struct array pic[512];
static int  x,y,i,j,k,l,p,q;
int input,bksize,yextent,xextent,loop;
int st,xfin,yfin,jfin,ifin,xrang,yrang;
int sigtobrain;
float multfactor;
static int prevout[512][480],resp[512][480],engn[512][480];
static int pbipolarresp[512][480],bipolarresp[512][480];
static int engn1[512][480];
/***************************************************************/ main()
{
unsigned base = 0x1600;
long mem = 0x200000L;
int flag = 1, block = 8;
sethdw(base,mem,flag,block);

for (; ;){
    printf("Enter a 1 if you want to use 2 camera images\n");
    printf("else enter a 0 to use 2 ready-made images\n");
    scanf("%d",&input);
    getchar();

initialize();         /* Initializes all hardware registers */ if (input == 1)  displaycameraimage();     /* Uses camera image */
    else displaystoredimage();                 /* Uses prestored image */ create();          . /* This function creates bksize x bksize blocks */
                         /* of pixels(Each block represents 1 receptor) */
                         /* and fills each block with its average intensity */
    st = bksize/2;       /* bksize defined by calling create */
    xfin = 512 + st;
    yfin = 480 + st;

printf("Enter an integer between 0 and 255 for the maximum number\n");
    printf("of receptors you want to the left and right of a receptor\n");
    printf("block in its inhibition region\n");
    scanf("%d",&xextent);
    getchar();

printf("Enter an integer between 0 and 239 for the number of\n");
    printf("receptor blocks you want above and below a receptor\n");
    printf("block in its inhibition region\n");
    scanf("%d",&yextent);
```

```c
getchar();

xrang = xextent * bksize;
yrang = yextent * bksize;

energynormalization();

for (y = 0; y < 480; y++) {
  for (x = 0; x < 512; x++) {
    pbipolarresp[x][y] = 0;   /* Assumes we were sleeping */
} } multfactor = 1.0;
for (loop = 1; loop < 6; loop++) {
   inhibit();  /* Obtains the steady state response for receptor cells */
}             /* after several passes through "inhibit" */ multfactor = 3.0;
for (loop = 1; loop < 4; loop++){   /* Obtains the steady-state response */
   inhibit();                       /* for bipolar cells after several */
}                                   /* passes through inhibit */
                                    /* Calculates and displays the */
                                    /* transient response of the bipolar */
                                    /* cells */ for (y = 0; y < 480; y++){
   for (x = 0; x < 512; x++){
      bipolarresp[x][y] = resp[x][y];
} } for (y = 0; y < 480; y++){
   for (x = 0; x < 512; x++){

/* Now compare the bipolar response to the previous */
        /* bipolar response.  If there was a change then */
        /* tell the user.  Then, run inhibit with the proper */
        /* weighting */ if (pbipolarresp[x][y] == bipolarresp[x][y]) {
        sigtobrain = 0;
        /*  chgarray[x][y] = 0;   */
      }
      else {
        sigtobrain = 1;
        x = y = 512;
        /*  chgarray[x][y] = 1;   */
      }
} } if (sigtobrain == 0 ) {
   printf("No change in illumination was detected\n");
   multfactor = 3.0;
   printf("This is the response for both the steady-state\n");
   printf("output and the output concerning motion\n");
   inhibit();
      inhibit();
   }
   else {
       printf("A change in illumination was detected\n");
       multfactor = 3.0;
       inhibit();
       printf("The steady state output is . . . .\n");
       inhibit();
                                 /* The signal sent to the brain that */
```

```c
        for (y = 0; y < 480; y++) {         /* motion has occured */
          for (x = 0; x < 512; x++) {
            resp[x][y] = bipolarresp[x][y];
        } } multfactor = 5.0;
        inhibit();
        printf("The signal sent that tells the brain\n");
        printf("that motion has occured is . . . . . . . \n");
        inhibit();
      }
      for (y = 0; y < 480; y++){
        for (x = 0; x < 512; x++){
          pbipolarresp[x][y] = bipolarresp[x][y];
      } }
      printf("Enter a 1 if you want to rerun the program\n");
      printf("otherwise enter a 0\n");
      scanf("%d",input);
      getchar();
      if (input == 0) {
        break;
      }
}
/*********************************************************************109*/
displaystoredimage()
{ for(; ;){
  printf("Enter a 0 if you want to display a rectangle\n");
  printf("Enter a 1 if you want to display a noisy scene\n");
  printf("Enter a 2 if you want to display vertical bars\n");
  printf("Enter a 3 if you want pic.pic (half lopass/half orig) \n");
  printf("with three low intensity rectangles\n");
  scanf("%d",&input);
  getchar();

if (input == 0){
    sclear(55,1);                       /* Clears the screen */
    aclear(240,32,144,144,25);          /*Displays a rectangle on the screen */
    printf("Okay . Reading image into array\n");
    for (y = 0; y <480; y++) {
      rhline(0,y,512,pic[y].data);
    }
  }
      if (input == 1){
        readim(0,0,512,480,"block.pic","no");    /*Reads in the noisy scene */
        printf("Okay . Reading image into array\n");
        for (y = 0; y <480; y++) {
          rhline(0,y,512,pic[y].data);
        }
      } if (input == 2){                  /* Displays vertical bars of increasing */
                                        /* intensity across the monitor. */
        aclear(0,0,64,480,64);
        aclear(64,0,64,480,80);
        aclear(128,0,64,480,96);
        aclear(192,0,64,480,112);
        aclear(256,0,64,480,128);
        aclear(320,0,64,480,144);
        aclear(384,0,64,480,160);
        aclear(448,0,64,480,176);
        printf("Okay . Reading image into array\n");
```

```c
      for (y = 0; y <480; y++) {
         rhline(0,y,512,pic[y].data);
      }
   } if (input == 3){
      readim(0,0,512,480,"pic.pic","no");       /*Reads in a noisy scene */
      printf("Okay .  Reading image into array\n");
      for (y = 0; y <480; y++) {
         rhline(0,y,512,pic[y].data);
      }
   } if (input != 0 && input != 1 && input != 2 && input != 3){
      printf("Bad input\n");
   }
   break;
   } return;

}
/***************************************************************
savecameraimages()              /* Displays successive images on the screen */
{ if (input == 1) {
   for (num = 1; num < nframes+1; num++) {
      snap(1);                                  /* Takes (n) consecutive */
      saveim(0,0,512,480,0,"picture.img","no"); /* pictures and saves them
   }
}
else if (input == 0) {
   for (num = 1; num < nframes+1; num++) {
      snap(1);                                  /* Takes a picture */
      saveim(0,0,512,480,0,"picture.img","no"); /* and saves it */
       if (num < nframes) {
          printf("Reposition the camera if you so desire\n");
          printf("After the camera has been properly\n");
          printf("positioned hit the CR key\n");
          getchar();
       }
   }
} return;

}
/****************************************************************/
create()                        /* This function creates bksize x bksize blocks */
                                /* of pixels(Each block represents 1 receptor) */
                                /* and assigns each pixel in a block the */
                                /* average intensity value of the block */

{
int   count,sum,avgint,xstart,ystart;
count=sum=0;

printf("Creating blocks representing receptor cells . . .\n");

for(l = 0; l < 480; l+=bksize) {

/* This loop reads 30 vertical blocks */
                                /* of bksize x bksize pixels(receptor cell) */
```

```c
    for (k = 0; k < 512; k+=bksize){
                                        /* This loop reads 32 horizontal blocks */
                                        /* of bksize x bksize pixels(receptor cell) */

/* Calculates the blocksize(1 block represents 1 receptor cell) */ for (j = 0; j < bksize; j++) {
                                        /* This loop reads bksize lines */
                                        /* of bksize pixels */ for (i = 0; i < bksize; i++){
                                        /* This loop reads 1 line of bksize pixels */ count = count + 1;

if (count == 1) {     /* If count = 1, save the upper left-hand */
            xstart = i+k;       /* x and y coordinates of the block */
            ystart = j+l;
          } sum += pic[j+l].data[i+k];    /* Sums up the intensities in the */
                                        /* bksize x bksize block */
      } }
      count = 0;

avgint = sum/(bksize*bksize);     /* Calculates the average intensity */
                                        /* for the bksize x bksize block */
                                        /* of pixels */ sum = 0;

for (j = ystart; j < ystart+bksize; j++) {

/* Fills the bksize x bksize block */
                                        /* of pixels with the average*/
                                        /* intensity value of the block */ for (i = xstart; i < xstart+bksize; i++){ pic[j].data[i] = avgint;      /* Stores the average value for each */
                                        /* bksize x bksize block */
                                        /* (receptor cell) */

} }
} }
 for(y = 0; y < 480; y++){              /* Displays on the monitor */
   whline(0,y,512,pic[y].data);         /* receptor blocks */
 }                                      /* Each block represents */
                                        /* 1 receptor cell */
return;
}
/*********************************************************************177*
inhibit()                       /* Simulates the affect neighboring receptor */
                                /* cells have on a omatidia. This result */
                                /* will be applied to each bksize x bksize */
                                /* block (represents 1 omatidia) and */
                                /* displayed on the screen */
                        /* Calculates and displays the transient response */
                        /* of the receptor cells */

{
```

```
   int xlc,xrc,yuc,ydc;
   int nr;
   double sumrsp,c1,c2,c3;
   sumrsp=0.0;
   c1 = -.0314/((double)bksize*bksize);

printf("processing. please wait...\n");

for (y = 0; y < 480; y++) {
     for (x = 0; x < 512; x++) {
       prevout[x][y] = resp[x][y];
   } } for (y = st; y < yfin; y+=bksize) {
for (x = st; x < xfin; x+=bksize) {
   if (x < xrang+st) xlc = st;
   else xlc = x-xrang;
                                      /* Calculates the left-most x */
                                      /* coordinate of the inhibition */
                                      /* region */ if (x > 512-xrang-st) xrc = 512-st;
   else xrc = x+xrang;
                                      /*Calculates the right-most x */
                                      /* coordinate of the inhibition */
                                      /* region */ if (y < yrang+st) ydc = st;
   else ydc = y-yrang;
                                      /* Calculates the lowest value */
                                      /* of y for the inhibition region */
                                      /* (Above yuc on the screen) */ if (y > 480-yrang-st) yuc = 480-st;
   else  yuc = y+yrang;
                                      /* Calculates the highest value */
                                      /* of y for the inhibition region */
                                      /* (Below ydc on the screen) */ sumrsp = 0.0;           /* Reinitializes the sum */
                                      /* of inhibitory responses */
                                      /* to 0 */
   ifin = xrc+bksize;
   jfin = yuc+bksize;
   nr = ((ifin-xlc)*(jfin-ydc))/(bksize*bksize);
   c3 = multfactor/nr;

for (j = ydc; j < jfin; j+=bksize) {
          for (i = xlc; i < ifin; i+=bksize) { if (i==x && j==y){  /* Excludes the response of the receptor */
                                 /* block you are looking at from the */
             }                   /* inhibited response */
             else { sumrsp += exp(c1*((double)(((i-x)*(i-x)/16)+(j-y)*(j-y))))*

((double)prevout[i][j]);

}

} }
```

```c
            resp[x][y] = engn1[x][y]-c3*sumrsp;

if (resp[x][y] < 0) resp[x][y] = 0;

/* Stores the inhibited response */
    }
/* Displays the transcient response of a scene */ for (p=0; p<480; p+=bksize) {
  for (q=0; q<512; q+=bksize) {
     aclear(q,p,bksize,bksize,resp[q+st][p+st]);
} }
printf("\n ok finished inhibit");
return;
}
/*****************************************************************370*/
energynormalization()    /* Minimizes energy variations in a scene */

{
int pix,acterm,avg,sumint,xlc,xrc,ydc,yuc,nr;
int countl, sumeng, avgengn, xst, yst;
double total,temp;

for (j = st; j < 480; j+=bksize) {
      for (i = st; i < 512; i+=bksize) {
        engn[i][j] = (int)(105.96*log10((double)(pic[j].data[i])));
    } } printf("processing. please wait...\n");
for (y = st; y < yfin; y+=bksize) {
  for (x = st; x < xfin; x+=bksize) {
    if (x < xrang+st) xlc = st;
       else xlc = x-xrang;               /* Calculates the left-most x */
                                         /* coordinate of the inhibition */
                                         /* region */ if (x > (512-xrang-st)) xrc = 512-st;
       else xrc = x+xrang;
                                         /*Calculates the right-most x */
                                         /* coordinate of the inhibition */
                                         /* region */ if (y < yrang+st) ydc = st;
       else ydc = y-yrang;
                                         /* Calculates the lowest value */
                                         /* of y for the inhibition region */
                                         /* (Above yuc on the screen) */ if (y > 480-yrang-st) yuc = 480-st;
       else   yuc = y+yrang;
                                         /* Calculates the highest value */
                                         /* of y for the inhibition region */
                                         /* (Below ydc on the screen) */ sumint = 0;                       /* Reinitializes the sum */
                                         /* of inhibitory responses */
                                         /* to 0 */
```

```
    /* Calculates the average intensity in the inhibition region */ jfin = yuc+bksize;
        ifin = xrc+bksize;
        nr = ((ifin-xlc)*(jfin-ydc))/(bksize*bksize);
                /* nr = number of receptors in the region */ for (j = ydc; j < jfin; j+=bksize) {
          for (i = xlc; i < ifin; i+=bksize) {
            sumint += engn[i][j];       /* Sums up the intensities */
        } }                              /* in the inhibiton region */ avg = sumint/nr;   /* Mult by 4 due to looping by 2 */ total = 0.0;

for (j = ydc; j < jfin; j+=bksize) {
          for (i = xlc; i < ifin; i+=bksize) {
              total += ((engn[i][j]-avg)*(engn[i][j]-avg));

/* Subtracts the average */
                                    /* intensity value from each */
                                    /* pixel in the inhibition region */
                                    /* Squares the ac component of the */
                                    /* intensity from ea??      ? the */
        } }                         /* inhibition regic */ pix = 128+((int)(101.0*sqrt((double)nr)*((dou    gn[x][y]-avg)) /
                                                  _qrt(total)+1.0) ));
/*      printf("\n %d %d %d %f %d",nr,engn[x  j,avg,total,pix);   */
                        /* Calculates the energy normalized value *
                        /* of the pixel */ if (pix > 255) pix = 255;
        if (pix < 0) pix = 0;

engn1[x][y] = pix;

/* Stores the energy normalized value */
                        /* of the pixel */

} } printf("Ready to display. Press RETURN\n");
getchar();

for (p=0; p<480; p+=bksize) {
  for (q=0; q<512; q+=bksize) { aclear(q,p,bksize,bksize,engn1[q+st][p+st]);
} } return;
}
```

At the beginning of the program of Table 2, the user selects images to process, an omatidium size (block size) (16 to match the parameter of the Limulus eye, and an inhibition region (a square region for the human eye and 31×9 for Limulus). The user can display either a camera image or a stored image on a monitor. If a stored image is selected, the user can display a square on a pristine background, squares added to noise, vertical bars of increasing intensity or a real image.

The subroutine CREATE divides the image into blocks of size [bksize×bksize] (for the horseshoe crab: [16×16]) where each block represents an omatidium in a crab. One option in the invention is as follows. The average intensity for each block is calculated and all pixels in a block are assigned this intensity value. The intensity value Of a block represents the average light intensity shining on that omatidium.

The user is then asked to input the maximum inhibition region in both the x and y directions ([31×9] for the horseshoe crab) and the inhibition region is calculated for each omatidium on the monitor screen.

The inhibition region for each omatidium will vary as a function of the omatidium's location on the monitor screen. For example, the inhibition region for the top left omatidium has no omatidia above it or to the left of its center. The affect of the inhibitory omatidia within an inhibition region is determined by implementing a modified version of equation 2 as follows:

$$\text{Inhibited Response of an omatidium} = \frac{(I - K \cdot Sumint) + prevout}{Nframes} \quad (3)$$

where
I = Intensity on the cell to be inhibited
Sumint = Sum of intensities from each omatidium
Prevout = previous omatidium output
Nframes = The Number Of Frames Processed (present and past)
K = Equation 4 as follows:

$$\exp\left(\frac{-0.0314 \cdot distx^2}{5 \cdot var \cdot bksize^2}\right) \cdot \exp\left(\frac{-0.0314 \cdot disty^2}{var \cdot bksize^2}\right) \quad (4)$$

where
distx = distance in the x direction between the cell being inhibited and inhibiting cell
disty = distance in the y direction between the cell being inhibited and inhibiting cell
var = variance in the y direction for the maximum inhibition region The value of K in equation 3 combines the threshold, which increases as a function of distance, and the inhibitory coefficient, which decreases as a function of distance. The two dimensional Gaussian function shown in equation 4 was used to model the distance effects of K. A Gaussian function was used because the weighting function is dome-like in appearance. The energy normalization phenomenon is not observed in the horseshoe crab because the horseshoe crab has no excitatory summation function, only latent inhibition; therefore, the energy normalization effect was not included in K. The variance used in the Gaussian function is dependent on the size of the inhibition region input by the user. The variance was calculated in this manner because it was assumed that lateral connection between omatidia are all the same.

After an omatidium block is inhibited, the inhibited intensity value is stored in the array RESP before repeating the inhibition process for the remaining omatidia. After processing the scene through inhibit, the inhibited intensity value (one point of the transient response) for each block is displayed. If inhibit is run over a series of input frames and the image does not change over several of the frames, a steady-state intensity value will be seen.

A computer program called TRY was developed as part of this invention to simulate the energy normalization, inhibition, and noise suppression processes in the vertebrate retina.

At the beginning of TRY, the user selects images to process, a cell size (blocksize), an excitation region and an inhibition region. The user can display either a camera image or one of several stored images as described in the previous discussion of the horseshoe crab.

The subroutine CREATE as described above for the horseshoe crab is used to create and display receptor cell blocks on a monitor if bksize was not set equal to one. The original image or the image resulting from the subroutine CREATE is then processed by the subroutine INHIBIT. The intensity values displayed on the monitor using the INHIBIT subroutine simulates the changes in membrane potential across every receptor cell, bipolar cell, or ganglion cell in the retina (depending on user choice). The equation used to calculate the potential across a retinal cell membrane is given discussed below (Werblin; 1974:67):

The inhibition region is an area which surrounds a receptor cell and dampens its electrooptic effect on adjacent cells when it is stimulated by the reception of an illuminating signal thereby allowing contrasts of light and dark images to be detected.

The excitation region is an area which surrounds a receptor cell and increases its electrooptic effect on adjacent cells.

Figure 4:
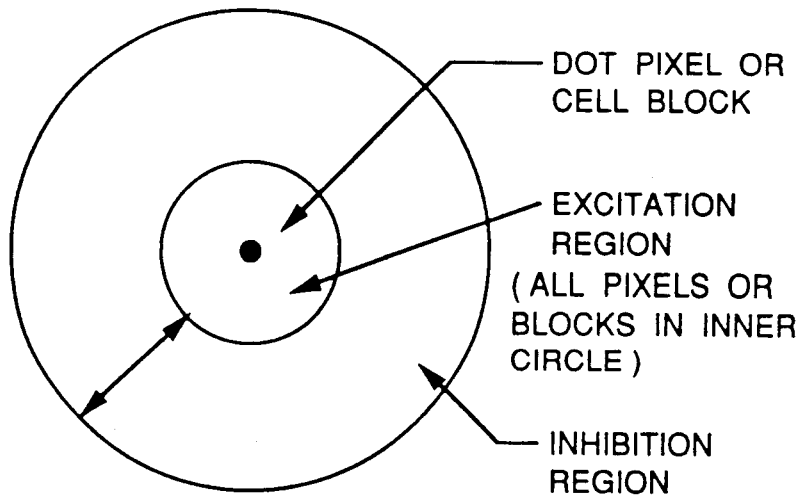
FIGS. 4 and 5 are illustrations that represent the inhibition region and excitation region of a retinal cell.
Figure 5:
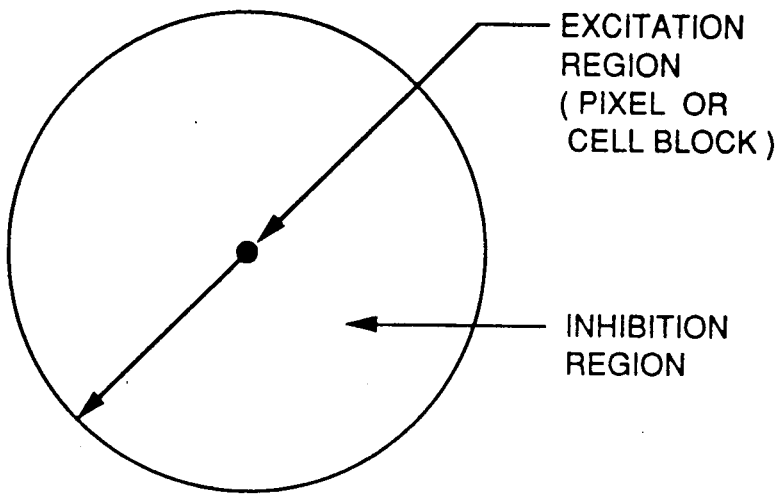

FIGS. 4 and 5 are illustrations of a cell which is a pixel or a block surrounded by an inhibition region and an excitation region. In FIGS. 4 and 5, "I" is the average intensity on the excitation region, of the cell, and "K" the average intensity on the inhibition region of the cell. In the present invention a digital image processing system is used in which the equation used to calculate the potential across a retinal cell membrane is given as follows:

$$V = \frac{Rmax \cdot (I)^n}{(I^n + K^n)} \quad (5)$$

where:
V = a measure of intensity displayed on the screen and measured in volts.
Rmax = Vmax which equals the maximum intensity displayable on the screen.
I = the average intensity on the excitation region (excitation center) of the cell
K = average intensity on the inhibition region (inhibition surround) of a cell
n = measure of the steepness of a retinal cell inhibition curve, where:
n is between 0.7–1.0 for the receptor cells
n is between 1.4–3.0 for the bipolar cells
n is between 3.0–4.0 for the ganglion cells
n is may be selected to be any number in other applications.

The following images were used to test the vertebrate retina computer program found in Table 1. The test results and program for the horseshoe crab are found in Table 2:

1. A noise free square surrounded by a noise free background.
2. Vertical stripes, increasing in intensity from left to right.
3. Three squares added to noise.

The right most square has an intensity value of three. The center square has an intensity value of five. The left most square has an intensity value of seven.

Note: This is before noise is added.

4. A picture of part of the Signal Processing Lab at the Air Force Institute of Technology.

An intensity plot for each image was taken from line 100. The parameters in equation 5 were varied to test their effects on the test patterns given above. The parameters in equation 5 were varied as follows:

1. Blocksize was made smaller;
2. Inhibition region was made smaller;
3. Excitation region was made larger; and
4. Multiplication factor (n) was varied.

It was observed after extensively varying the parameters given above that making the excitation region, inhibition region, and/or blocksize larger, excessively blurred the edges of an image. It was also observed that when the value of the multiplication factor (n) was reduced, less enhancement of the edges occurred. The best results were obtained after extensively manipulating the parameters given above. The best results obtained as part of this invention were obtained by varying the parameters in equation 5.

There are several alternatives to choose from when implementing the vertebrate retinal software into hardware.

Three alternatives are listed below:

1. Hardwire connections can be used to connect silicon chips used to implement equation 5.
2. The connections between silicon chips can be done optically. The extraction of intensity information from the excitation and inhibition region for each pixel in an image can be done in parallel or in a serial fashion.
3. The connections and implementation of equation 5 can be done optically.

Although all the above alternatives should be looked at, alternative 2 would be the easiest to implement, especially if the extraction of intensity information from the excitation and inhibition regions of each cell block was extracted serially. A mirror of some lens system could perform the task of extracting intensity information serially from an image.

Once equation 5 is implemented in hardware it can then be used as a preprocessor to a correlator or other pattern recognition system. As noted above, the present invention digitally implements equation 5.

Once the retinal model extracts signals buried essentially in noise, then equation 5 should be equated to a modified version of equation 2 (horseshoe crab equation) and solved for K (horseshoe crab equation) for different combinations of the parameters in equation 5. Once a formula for K is determined the interaction between individual cells can then be modeled when the inhibition and excitation regions are fully illuminated. This approach can also model cell behavior for other than full field illumination.

Once equation 5 is optimized a retinal processor can be used on other signals (i.e., communication signals).

The program in Table 1 can be modified to process only one line of data. The average intensity for each inhibition; excitation, and averaging region was calculated using this one line of data. It was determined during the course of this invention that averaging a scene is not needed if the parameters in equation 5 are chosen properly. The parameters used to show the effects of averaging are as follows:

1. Blocksize=1;
2. the number of excitatory cells to the left and right of the pixel to be processed=21;
3. the inhibition region is 105 times wider than the excitation region;
4. Multfactor=15.0 for each time the image is processed through INHIBIT; and
5. the averaging region is 3 times wider than the excitation region.

The effects of averaging a scene and then using equation 5 indicates that averaging a scene has a negligible effect in reducing noise in a scene.

To reduce blurring at the edges, images were passed through the subroutine INHIBIT up to three times. The effect of processing the data in this way improved resolution (extremely sharp peaks at the edges) and eliminated essentially all the noise in the scene.

Finally, this program was modified to process all 512 lines of pixels using the inhibition regions as calculated above. Using this technique reduced the processing of images on the Micro-Vax II took about 30 hours for 512 lines of pixels, and approximately one hour for 512 lines of pixels processed along one dimension.

Figure 3:
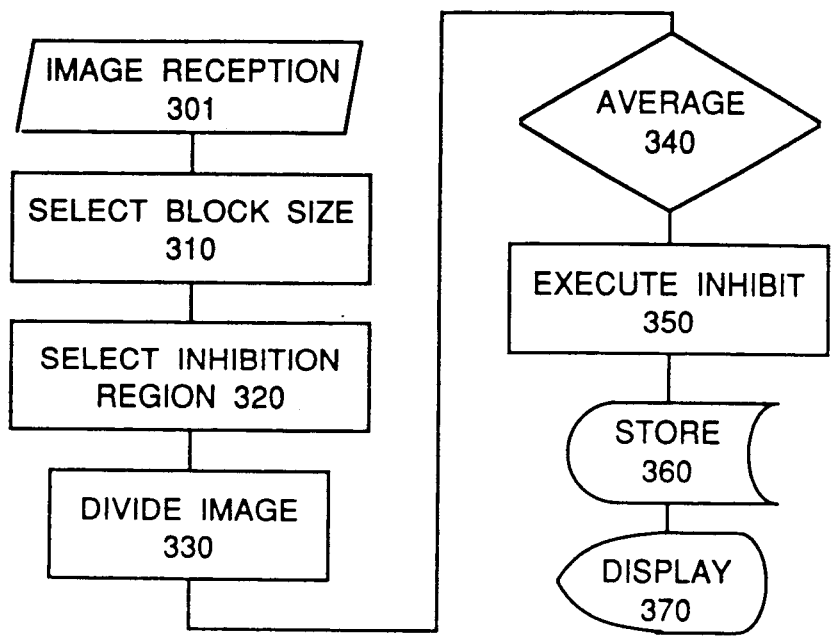
FIG. 3 is a block diagram of the steps of the process of the present invention.

If the present invention were expressed as a process, FIG. 3 is a block diagram of the steps that the user of the system of FIG. 1 would follow.

The process begins with the image reception step 301, in which the computer 120 of FIG. 1 receives an image from the camera 100 via the Micro-Vax interface 110. Next, the user selects a block size 310 on the computer 120 that replicates the omatidium of the Limuls or the retinal cell of the retina being modeled. For example a suitable Limulus block size would be 16, while a suitable block size to model a human retinal cell would be 1.

In the next step, the inhibition region size and in the case of the vertibrate retina, the excitation region is selected 320. As in the biological retina, the inhibition region is an area which surrounds the omatidium which dampens its electrooptic effect on adjacent cells when it is stimulated by the reception of an illuminating signal. The presence of an inhibition region allows sharp light and dark contrasts to be detected by the retina, and its size should reflect the type of retina being modeled. The excitation region is an area which surrounds a receptor cell and increases its electrooptic effect on adjacent cells. For example, a suitable inhibition region size for a Limulus retina model would be 31×9. For a human eye, the inhibition region should be a square area, and occupy about 90% of the number of pixels in the image. Now that the inhibition and excitation region size has been selected 320 the received image is divided in step 330 into blocks of a size where each block represents an omatidium of the limulus, or retinal cell of the area selected in step 310. As mentioned above, one option of the invention is then to compute the average intensity of each block, and assign all pixels of this block to average intensity value 340. The advantages and disadvantages of this averaging step have been discussed above, and the user may experiment with this step to see if it improves the image processing for his particular application. The advantage of this digital image processing system is its extreme flexibility in allowing users to adjust all parameters.

Now that all block regions of the image are defined, the computer 120 will execute the inhibit function on the values of each block as defined above in equation 3. The result is an output of the inhibited response of each omatidium 350.

Next, the computer 120 will store the resulting inhibited intensity values to produce a combined processed output 360, and direct the monitor 130 of FIG. 1 to display the combined processed output 370.

As mentioned above, variations on the parameters are easily made by inputting any desired changes into the computer 120 of FIG. 1, for example, the inhibit subroutine might use equation 5 to simulate the change in potential across every receptor cell, instead of using equation 3. To reduce blurring on the edges of the processed image, the processed image might also be passed through the inhibit subroutine three times. As mentioned above, the inhibit function generally tends to increase the contrast between light and dark in the processed image. Note that the inhibit function used in the vertebrate computer program performs more than the inhibit function.

Specifically, it performs energy normalization, inhibition and noise suppression.

The retina model uses the Weber equation (Equation 5) to determine the response of a cell (represented by a pixel or a block of pixels). The retina model described above does not take in account the effects of distance as was done with the Limulus (horseshoe crab) model. This resulted in an average value being used in the Weber equation that might have been lower or higher than the "correct" value. Some cell blocks were assigned a value higher than desired. This is believed to be the main cause of blurring in test images used during this effort. The new retinal model will take this into account. Since the system is using a constant density eye it will be assumed that the weighting between any two cells is equal to alpha where $0 \leq alpha \leq 1$. Another weighting might work better but with inadequate data this choice seems as good as any. The model described above also assumes an inhibition region that varies only as a function of a pixel or block of pixels position on the screen. The size of the inhibition region near the edge should be larger than that used if it is assumed that the attenuation effects are a function of only the distance. Additionally, the above-described model assumed that the full field illumination region was the same no matter what illumination level was used. It is now believed that the region of full field illumination should increase as the intensity level of the inhibition region is increased (taken care of by weighting the intensity of pixels in the inhibition region of a cell block which varies as a function of distance).

Specifically to calculate the inhibited response INHIBRESP:

$$INHIBRESP = I - SUM (WT*PIXINT)$$

WHERE I = Average intensity of a cell block or the average intensity of the cell block and that of cells in adjacent regions (Excitation region).

WT = antenuation factor which varies as a function of distance. In this implementation WT = to some function of ALPHA. Another weight could be used if desired.

PIXINT = Average intensity of a cell block in the inhibition region.

SUM = Add the weighted cell block intensity values in the inhibition region.

Lambert in his pattern recognition system equated the response SUM (WT*PIXINT) to the average intensity level of a fixed inhibition region. If the attenuation weighting between any two cell blocks is set equal to ALPHA the response SUM (WT*PIXINT) may not be equal to the average intensity value of the inhibition region. If you assume that the response SUM (WT*PIXINT) = average intensity level in the inhibition region scale the response SUM (WT*PIXINT) by K (K not equal to one) or equivalently scale all weights ALPHA by K to equate the response to the correct average value. If Capt. Lambert's assumption is correct I expect better results then that demonstrated by the Lambert algorithm because of the refinements made to selecting the "correct" inhibition region.

If the response SUM (WT*PIXINT) is not equal to the average intensity value in the inhibition region then the only way to use the Weber equation is to equate a response with an average intensity value in an inhibition region. By illuminating rings of pixels between full field illumination regions one might be able to derive an equation for use in the Weber equation to predict cell responses over all illumination conditions and not be limited to full field conditions. For best results (Least amount of blurring) use the intensity value of the pixel block being processed as the value of I in the Weber equation (equation 5).

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A digital image processing system which receives a video image and which models lateral inhibition, energy normalization and noise suppression processes in a generic retina in order to display an improved video image with enhanced edges and suppressed noise, said digital image processing system comprising:

a camera which receives said video image and converts it into analog electrical video image signals to produce an output;

a means for digitizing the output of said camera, said digitizing means being electrically connected with said camera and converting said analog electrical video image signals into digital electronic video image signals;

a means for digitally modeling said generic retina which receives and processes said digital electronic video image signals from said digitizing means to produce said improved video image by selecting a block size that replicates a receptor cell of said generic retina, selecting an inhibition region size and an excitation region size, said inhibition region being an area which surrounds said receptor cell and which dampens its electrooptic effect on adjacent cells when it is stimulated by reception of a illuminating signal thereby allowing contrasts of light and dark images to be detected, and wherein said excitation region increases its electrooptic effect on adjacent cells said digitally modeling means dividing said digital electronic image signals into blocks which have a size such that each block represents said receptor cell of said generic retina and executing an inhibit function about each block to determine effects said inhibition region would have, and said inhibit function also performing energy normalization when said generic return represents a vertibrate retina, said inhibit function producing thereby said improved video image; and a means for displaying said improved video image, said displaying means being electrically connected to said means for digitally modeling said generic retina and receiving signals therefrom.

2. A digital image processing system, as defined in claim 1, wherein said means for digitally modeling said generic retina comprises a computer which is programmed to model a human retina by selecting 1 pixel as said block size which simulates said retinal cell, and selecting a square area as said inhibition region size such that said square area occupies over ninety percent of said digital electronic video image signals, said excitation region also being a square area of at least one pixel in area and as small as possible.

3. A digital image processing system, as defined in claim 2, wherein the equation used to calculate the potential across a retinal cell membrane is given as follows:

$$V = \frac{Rmax^* (I)^n}{(I^n + K^n)}$$

where:
Rmax = Vmax which equals the maximum intensity displayable on a screen
V = a measure of intensity displayed on the screen and measured in volts
I = the average intensity on the excitation region (excitation center) of the cell
K = average intensity on the inhibition region (inhibition surround) of a cell
n = measure of the steepness of a retinal cell inhibition curve, where:
n is between 0.7–1.0 for the receptor cells
n is between 1.4–3.0 for the bipolar cells
n is between 3.0–4.0 for the ganglion cells.

4. A digital image process which models lateral inhibition and energy normalization characteristics of a generic retina while processing a video image to produce an improved video image with noise suppression and improved contrast distinction, said digital image process comprising the steps of:

receiving said video image from a scene with a camera which receives and converts said video image into an analog electrical video image signal, said camera producing an output thereby;
converting said analog electrical video image signal into a digital electric video image signal;
selecting a block size that replicates a retinal cell of said generic retina;
selecting in inhibition region size, said inhibition region being an area which surrounds said retinal cell and which dampens its electrooptic effect on adjacent cells when it is stimulated by reception of a strong illuminating signal thereby allowing contrasts of light and dark images to be detected;
selecting an excitation region size, said excitation region being an area which surrounds said retinal cell and which increases the electrooptic effect when it is stimulated by said illuminating signal;
dividing said video image into blocks which have a size such that each block represents said retinal cell of said generic retina;
executing an inhibit function about each block to determine effects said inhibition region and said excitation region would have, and to produce thereby said improved video image; and
displaying said improved video image.

5. A digital image process, as defined in claim 4 wherein said execution step comprises performing an equation on said digital video image signal, wherein the equation used to calculate the potential across a retinal cells membrane is given as follows:

$$V = \frac{Rmax^* (I)^n}{(I^n + K^n)}$$

where:
Rmax = Vmax which equals the maximum intensity displayable on a screen
V = a measure of intensity displayed on the screen and measured in volts
I = the average intensity on the excitation region (excitation center) of the cell
K = average intensity on the inhibition region (inhibition surround) of a cell
n = measure of the steepness of a retinal cell inhibition curve, where:
n is between 0.7–1.0 for the receptor cells
n is between 1.4–3.0 for the bipolar cells
n is between 3.0–4.0 for the ganglion cells.

* * * * *